United States Patent
Zhang et al.

(10) Patent No.: US 10,901,279 B2
(45) Date of Patent: Jan. 26, 2021

(54) LIQUID CRYSTAL DISPLAY PANEL AND 3D PRINTER

(71) Applicant: SHANGHAI TIANMA MICRO-ELECTRONICS CO., LTD., Shanghai (CN)

(72) Inventors: Yongmei Zhang, Shanghai (CN); Chen Wang, Shanghai (CN); Paijie Chen, Shenzhen (CN); Jiawei Han, Shenzhen (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 0 days.

(21) Appl. No.: 16/505,510

(22) Filed: Jul. 8, 2019

(65) Prior Publication Data

US 2019/0331948 A1     Oct. 31, 2019

(30) Foreign Application Priority Data

Sep. 5, 2018   (CN) .......................... 2018 1 1032683

(51) Int. Cl.
   *G02F 1/1335*   (2006.01)
   *G02F 1/1347*   (2006.01)
   *G02F 1/1343*   (2006.01)
   *B33Y 30/00*    (2015.01)
   *B33Y 80/00*    (2015.01)

(52) U.S. Cl.
   CPC ...... *G02F 1/1347* (2013.01); *G02F 1/133526* (2013.01); *G02F 1/134336* (2013.01); *B33Y 30/00* (2014.12); *B33Y 80/00* (2014.12)

(58) Field of Classification Search
   CPC .................................................... G02F 1/1347
   See application file for complete search history.

(56) References Cited

U.S. PATENT DOCUMENTS

| | | | | |
|---|---|---|---|---|
| 6,540,576 B1* | 4/2003 | Watanabe | ............... | H01J 9/242 445/24 |
| 2003/0223218 A1* | 12/2003 | Kawakami | ........... | G02B 6/0061 362/612 |
| 2008/0036759 A1* | 2/2008 | Koike | ..................... | G02B 30/00 345/419 |
| 2015/0042926 A1* | 2/2015 | Akasaka | ........... | G02F 1/133512 349/95 |
| 2018/0067355 A1* | 3/2018 | Kim | ..................... | G02F 1/13363 |
| 2018/0173048 A1* | 6/2018 | Ito | ....................... | G02F 1/13306 |

FOREIGN PATENT DOCUMENTS

| | | |
|---|---|---|
| CN | 101135801 A | 3/2008 |
| CN | 107748465 A | 3/2018 |

* cited by examiner

*Primary Examiner* — Sang V Nguyen
(74) *Attorney, Agent, or Firm* — Alston & Bird LLP

(57) ABSTRACT

Provided are a liquid crystal display panel and a 3D printer. The liquid crystal display panel includes a first substrate and a second substrate disposed opposite to the first substrate, and a liquid crystal layer which is disposed between the first substrate and the second substrate, where a surface on one side of the first substrate is provided with at least one first lens, and a surface on one side of the second substrate is provided with at least one second lens. The liquid crystal display panel provided by the embodiments of the present disclosure is used in a 3D printer with a photo-curing material.

15 Claims, 11 Drawing Sheets

LIQUID CRYSTAL DISPLAY PANEL AND 3D PRINTER

CROSS-REFERENCES TO RELATED APPLICATIONS

This application claims priority to a Chinese patent application No. CN 201811032683.3 filed on Sep. 5, 2018, disclosure of which is incorporated herein by reference in its entirety.

TECHNICAL FIELD

The present disclosure relate to three dimensions (3D) printing technologies and in particular, to a liquid crystal display panel and a 3D printer.

BACKGROUND

One of the rapid prototyping technologies is known as 3D printing. The technology is used to manufacture an object through a molding device in a layer-by-layer superimposing manner based on three-dimensional model data of the object, which may overcome the special structural obstacles in the conventional mechanical processing, thereby implementing the simple production of complex structural components. The existing 3D printing technologies are mainly divided into a fused deposition molding (FDM), selective laser sintering (SLS), stereolithography (SLA), and digital light processing (DLP).

For the SLA molding technology based on a liquid crystal display panel, the basic implementation manner of the existing device is as follow. The liquid crystal display panel is applied to the 3D printing, is used as a light shade during printing and controls ultraviolet light to be accurately exposed at a specific pattern position. Using the negative resin as an example, the exposed resin material may be cured, and the cured resin moves in the Z direction. A tray of a photo-curable molding device lifts a molded structure. The liquid crystal display panel switches to the next cross-sectional shape, the tray is lowered to repeat the same operation, and finally the desired 3D objects are printed, thereby implementing 3D continuous printing. A direct-emitting type 385 nm/405 nm/420 nm near-ultraviolet light-emitting diode (LED) light source is used as a backlight. The light source is collimated by a Fresnel lens, and passes through a diffusion sheet, so that light emitted on the liquid crystal display panel is evenly distributed.

However, when the collimation of the light emitted from the current 3D printing panel is poor, and in particular, when the distance from the panel to the resin tank increases, the printing in a 1:1 scale may not be performed, and a problem of low printing accuracy exists.

SUMMARY

The present disclosure provides a liquid crystal display panel and a 3D printer. The liquid crystal display panel is applied to the 3D printer to improve the collimation of a light source and increase the accuracy of the 3D printing.

In one aspect, the present disclosure provides a liquid crystal display panel. The liquid crystal display panel includes a first substrate and a second substrate disposed opposite to the first substrate, and a liquid crystal layer which is disposed between the first substrate and the second substrate. A surface on one side of the first substrate is provided with at least one first lens, and a surface on one side of the second substrate is provided with at least one second lens.

In another aspect, the present disclosure provides a 3D printer. The 3D printer includes a rack, a light source, a raw material tank, a printing platform, a lifting device, a printing control system, and the liquid crystal display panel described above. The lifting device is connected to the printing platform and is disposed on the rack. The raw material tank is disposed below the printing platform and a bottom of the raw material tank is transparent. The liquid crystal display panel is disposed below the raw material tank, and the light source is disposed below the liquid crystal display panel.

The printing control system is electrically connected to the light source, the lifting device and the liquid crystal display panel respectively, and is configured to control light emitted by the light source to be emitted to the printing platform through the liquid crystal display panel to enable a raw material on a surface of the printing platform to implement 3D printing.

The liquid crystal display panel provided in the present disclosure includes the first substrate and the second substrate disposed opposite to the first substrate, and the liquid crystal layer which is disposed between the first substrate and the second substrate. The surface on one side of the first substrate is provided with at least one first lens, and the surface on one side of the second substrate is provided with at least one second lens. The liquid crystal display panel is used in a 3D printer of a photo-curing manner, and may enable the light emitted by the light source to be converged and collimated when the light is emitted to and emitted from the liquid crystal display panel by disposing the first lens and the second lens which have a light concentrating function on the surfaces of the first substrate and the second substrate, so as to improve the accuracy of 3D printing.

DETAILED DESCRIPTION

Figure 1:
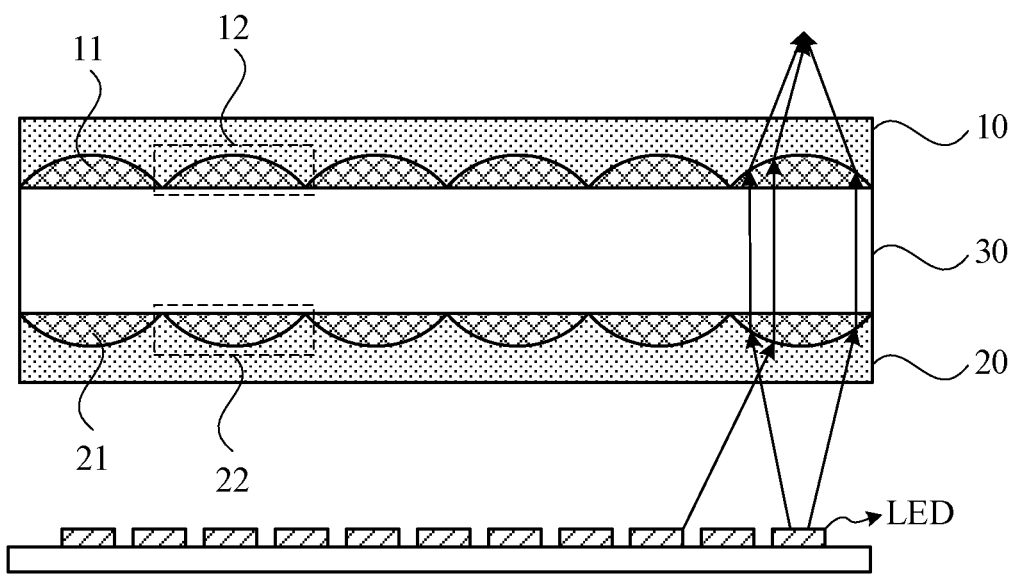
FIG. 1 is a structural diagram of a liquid crystal display panel according to an embodiment of the present disclosure.

Hereinafter the present disclosure will be further described in detail in conjunction with the drawings and embodiments. It should be understood that the specific embodiments set forth below are intended to illustrate and not to limit the present disclosure. Additionally, it is to be noted that, for ease of description, only part, not all, of the structures related to the present disclosure are illustrated in the drawings.

Terms used in the present disclosure are only used to describe specific embodiments and not intended to limit the present disclosure. It is to be noted that spatially related terms, including "on", "below", "left" and "right" used in the present disclosure, are described from the perspective of the drawings, and are not to be construed to limit the present disclosure. In addition, in the context, it will be understood that when a component is formed "on" or "below" another component, it may not only be directly formed "on" or "below" another component, and may also be indirectly formed "on" or "below" another component via an intermediate component. Terms like "first" and "second" are for description only and do not denote any order, quantity, or importance, but rather are used to distinguish different components. For those of ordinary skilled in the art, the above terms can be construed according to specific circumstances in the present disclosure.

The present disclosure provides a liquid crystal display panel. The liquid crystal display panel includes a first substrate and a second substrate disposed opposite to the first substrate, and a liquid crystal layer which is disposed between the first substrate and the second substrate. A surface on one side of the first substrate is provided with at least one first lens, and a surface on one side of the second substrate is provided with at least one second lens.

The liquid crystal display panel provided by the present disclosure is used in a 3D printer of a photo-curing manner, and may enable the light emitted by the light source to be converged and collimated when the light is emitted to and emitted from the liquid crystal display panel by disposing the first lens and the second lens which have a light concentrating function on the surfaces of the first substrate and the second substrate, so as to improve the accuracy of 3D printing.

Exemplarily, FIG. 1 is a structural diagram of a liquid crystal display panel according to an embodiment of the present disclosure. Referring to FIG. 1, the liquid crystal display panel includes a first substrate 10 and a second substrate 20 disposed opposite to the first substrate, and a liquid crystal layer 30 which is disposed between the first substrate 10 and the second substrate 20. A surface on one side of the first substrate 10 is provided with at least one first lens 11, and a surface on one side of the second substrate 20 is provided with at least one second lens 21.

It should be understood that the first lens 11 and the second lens 21 may be convex lenses or in the shape equivalent to the convex lens. When the light passes through the first lens 11 and the second lens 21, the light may be converged. The focal distance of the lens and the distance from the light source are adjusted. For example, when the second substrate 20 is on the side facing to the light source, the light source is disposed on the focal plane of the second lens 21, and the plane to be cured is disposed on the focal plane of the first lens 11, which may effectively improve the accuracy of 3D printing.

It is to be noted that the first lens 11 shown in FIG. 1 is disposed on a lower surface of the first substrate 10, and the second lens 21 is disposed on an upper surface of the second substrate 20, which is merely an exemplary embodiment of the present disclosure. The first lens 11 may be disposed on an upper surface of the first substrate 10, may be disposed on a lower surface of the first substrate 10, may be externally disposed on the first substrate 10 (for example, connected through the glue), or may be built in the first substrate 10. The number of the first lens 11 may be one or may be multiple, and this number is the same as the number of the second lens 21. This condition is not limited in the present disclosure.

The following is described by using the first lens being disposed on the lower surface of the first substrate and the second lens being disposed on the upper surface of the second substrate as an example, and the embodiments of the liquid crystal display panel provided by the present disclosure are described in detail. In one embodiment, referring to FIG. 1, the surface on one side of the first substrate 10 is provided with at least one first groove 12, and the at least one first groove 12 is filled with a first transparent material to form the at least one first lens 11. The surface on one side of the second substrate 20 is provided with at least one second groove 22, and the at least one second groove 22 is filled with a second transparent material to form the at least one second lens 21.

It should be understood that the grooves on the first substrate 10 and the second substrate 20 may be formed through a photothermographic molding method, laser processing or acid etching. The first lens 11 and the second lens 21 may be formed by respectively filling the first groove 12 and the second groove 22 with the first transparent material and the second transparent material though a precision injection molding method.

Optionally, transmissivity of the first transparent material and/or the second transparent material is greater than 95%.

It should be understood that, since the existing photo-cured 3D printing usually uses a 385 nm/405 nm/420 nm near-ultraviolet lattice LED light source as a backlight and the 405 nm ultraviolet LED is most widely used, the light loss may be reduced and the transmittance and contrast of the liquid crystal display panel may be effectively improved by configuring the transmissivity of the first transparent material and/or the second transparent material to the 405 nm ultraviolet light to be greater than 95%.

Optionally, the first groove may be one of a spherical crown, a half-cylinder, a prism and a cone, and the second groove may be one of the spherical crown, the half-cylinder, the prism and the cone.

It should be understood that, the shapes of the first groove and the second groove may be the same or may be different. When their shapes are the same, they may be manufactured by using the same process, which simplifies the process and reduces the costs.

Figure 2:
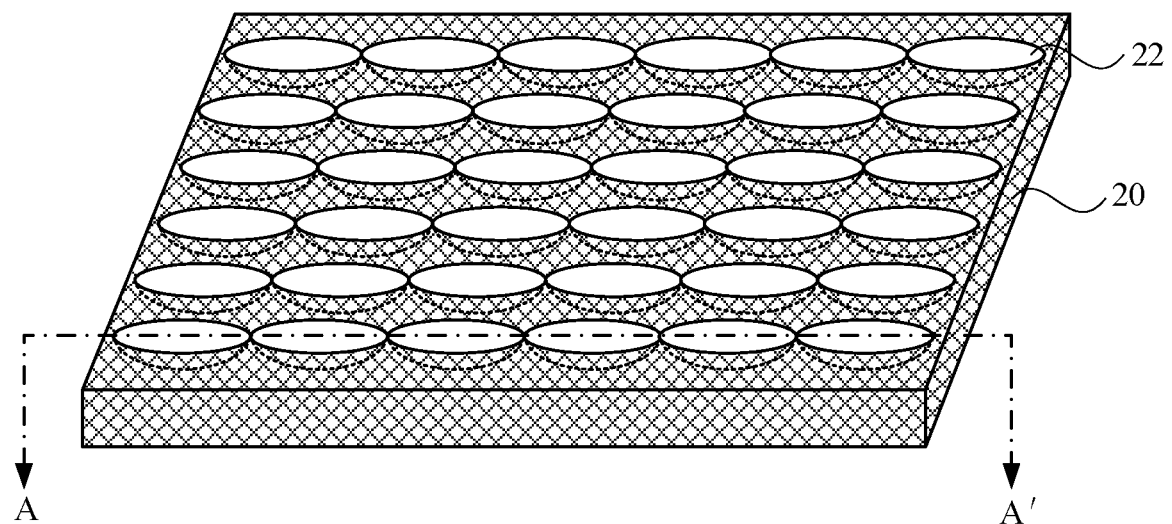
FIG. 2 is a top view of a second substrate according to an embodiment of the present disclosure.
Figure 3:
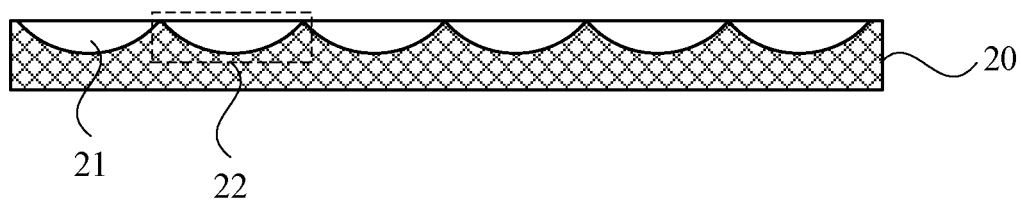
FIG. 3 is a cross sectional view taken along a line A-A' in FIG. 2.
Figure 4:
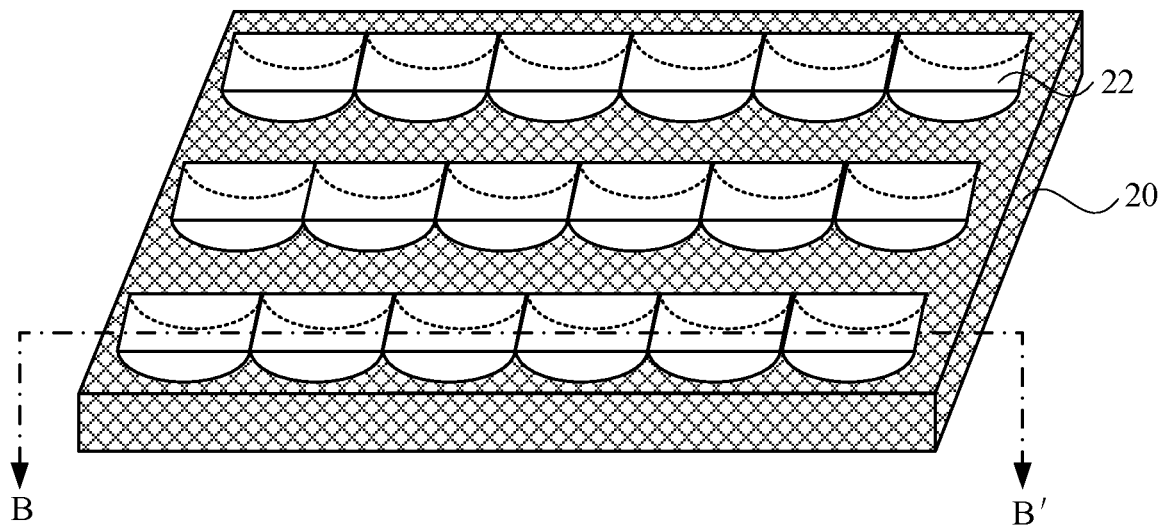
FIG. 4 is a top view of another second substrate according to an embodiment of the present disclosure.
Figure 5:
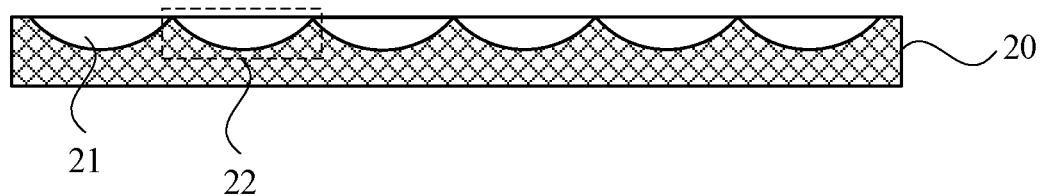
FIG. 5 is a cross sectional view taken along a line B-B' in FIG. 4.
Figure 6:
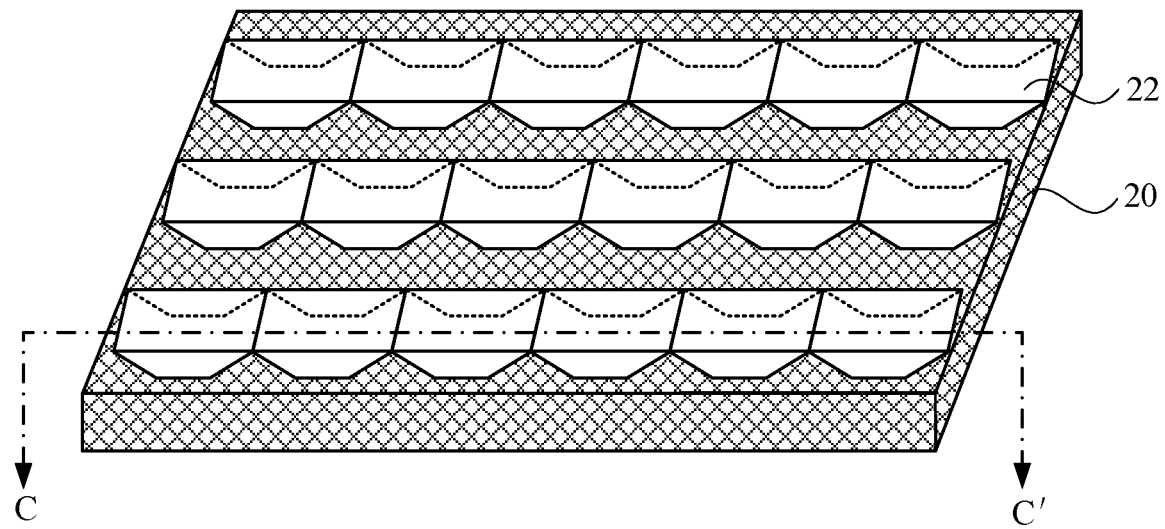
FIG. 6 is a top view of another second substrate according to an embodiment of the present disclosure.
Figure 7:
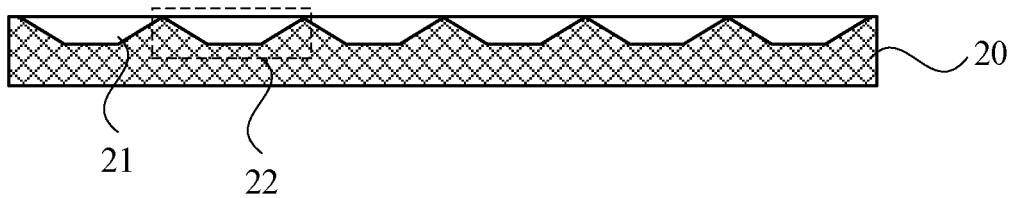
FIG. 7 is a cross sectional view taken along a line C-C' in FIG. 6.
Figure 8:
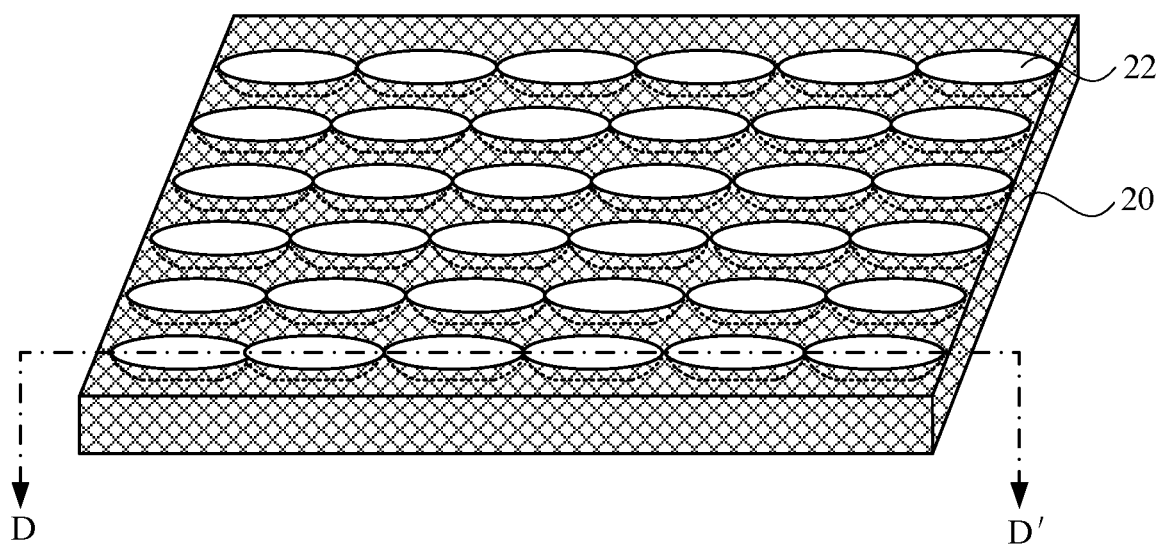
FIG. 8 is a top view of another second substrate according to an embodiment of the present disclosure.
Figure 9:
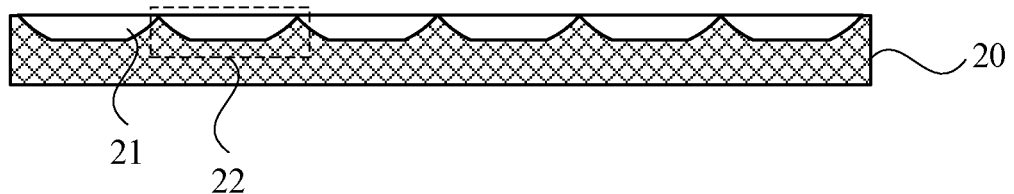
FIG. 9 is a cross sectional view taken along a line D-D' in FIG. 8.

Exemplarily, using the shapes of the first groove and the second groove being the same as an example, FIG. 2 is a top view of a second substrate according to an embodiment of the present disclosure, FIG. 3 is a cross sectional view taken along a line A-A' in FIG. 2, FIG. 4 is a top view of another second substrate according to an embodiment of the present disclosure, FIG. 5 is a cross sectional view taken along a line B-B' in FIG. 4, FIG. 6 is a top view of another second substrate according to an embodiment of the present disclosure, FIG. 7 is a cross sectional view taken along a line C-C' in FIG. 6, FIG. 8 is a top view of another second substrate according to an embodiment of the present disclosure, and FIG. 9 is a cross sectional view taken along a line D-D' in FIG. 8. Referring to FIGS. 2 to 9, the shape of the second groove 22 may be one of the spherical crown, the half-cylinder, the prism and the cone.

It is to be noted that the lens and groove shapes shown in FIGS. 2 to 9 are just exemplary, and the side length of the prism is not limited. The shape of the second groove in the top view may be a circle, a rectangle, a hexagon, or the like. The shape of the groove is not limited to those shown in these figures in the present disclosure.

Referring to FIG. 1, FIG. 1 exemplarily shows a process diagram of light during 3D printing. Optionally, the shape of the first groove 12 is reversely symmetric to the shape of the second groove 22 relative to the liquid crystal layer 30. A projection of the first groove 12 on the second substrate 20 fully overlaps with the respective second groove 22.

It should be understood that, in the embodiment, the number of the first lenses is the same as the number of the second lenses. The shapes of the first lenses are reversely symmetric to the shapes of the second lenses. Preferably, the number of the first lenses and the second lenses is plural, and each first lens corresponds to a respective one second lens. Therefore, in one aspect, the first lenses and the second lenses may be manufactured by using the same process, which effectively improves the productivity; and in another aspect, since each first lens corresponds to a respective second lens, the LED light source (which may be a 385 nm/405 nm/420 nm near-ultraviolet lattice LED light source) is disposed on the focal plane of the second lens. Since the divergence angle of light emitted by a point light source is large, when the light emitted from the LED light source passes through the second lens 21 on the second substrate 20, the light is converged and becomes parallel light. At this moment, in condition that the liquid crystal layer is in a light transmissive state, the light reaches the first lens 11 and is re-converged, and the light is converged on the surface of the printing material to be cured (for example, may be a liquid resin), so that the 3D printing is implemented in conjunction with the rise of the material tank and the control of the change of the liquid crystal display panel screen.

Figure 10:
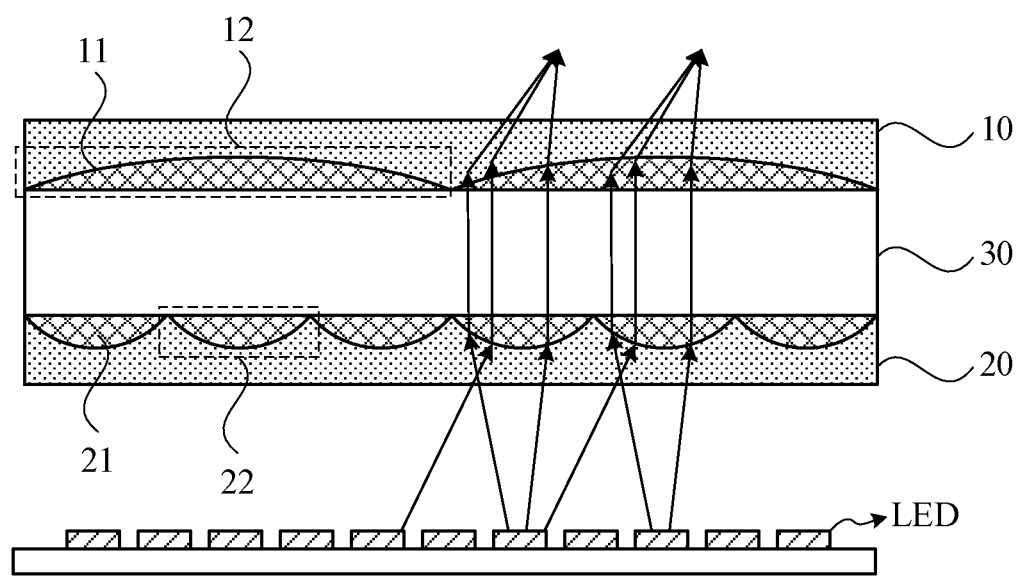
FIG. 10 is a structural diagram of another liquid crystal display panel according to an embodiment of the present disclosure.

It is to be noted that the number of the first lenses may be different from the number of the second lenses. FIG. 10 is a structural diagram of another liquid crystal display panel according to an embodiment of the present disclosure. Referring to FIG. 10, one first lens 11 corresponds to multiple second lenses. The light converged and collimated after passing through the multiple second lenses 21 is converged in the same direction after passing through the first lens 11 to meet the usage requirements in certain specific situations.

Optionally, a refractive index of the first transparent material is greater than a refractive index of the first substrate, and a refractive index of the second transparent material is greater than a refractive index of the second substrate. Optionally, a forming material of the first substrate and/or the second substrate is glass, and the first transparent material and/or the second transparent material includes one of silicon, quartz and polymethyl methacrylate.

The light convergence function of the first lens and the second lens is implemented by setting the refractive index of the first transparent material to be greater than the refractive index of the first substrate, and setting the refractive index of the second transparent material to be greater than the refractive index of the second substrate as well as in conjunction with the shapes of the first lens and the second lens, thereby improving the printing accuracy of the liquid crystal display panel during 3D printing.

It should be understood that the first transparent material and the second transparent material may use the inorganic material, such as silicon, quartz and the like, or may use the organic material, such as polymethyl methacrylate (PMMA) and the link. The first transparent material and the second transparent material may be the same or may be different, which may be selected according to actual implementation conditions.

Optionally, a refractive index of the first transparent material and/or the second transparent material range from 0.8 to 5.0.

It should be understood that the greater the difference in refractive index between the two media, the smaller the refraction angle corresponding to the same incidence angle when the light is emitted from the light-diffusing medium to the optically dense medium, and by selecting a material with a greater refractive index, the light converge ability of the lens may be increased, the lens volume may be effectively reduced and the thickness of the liquid crystal display panel may be reduced.

Figure 11:
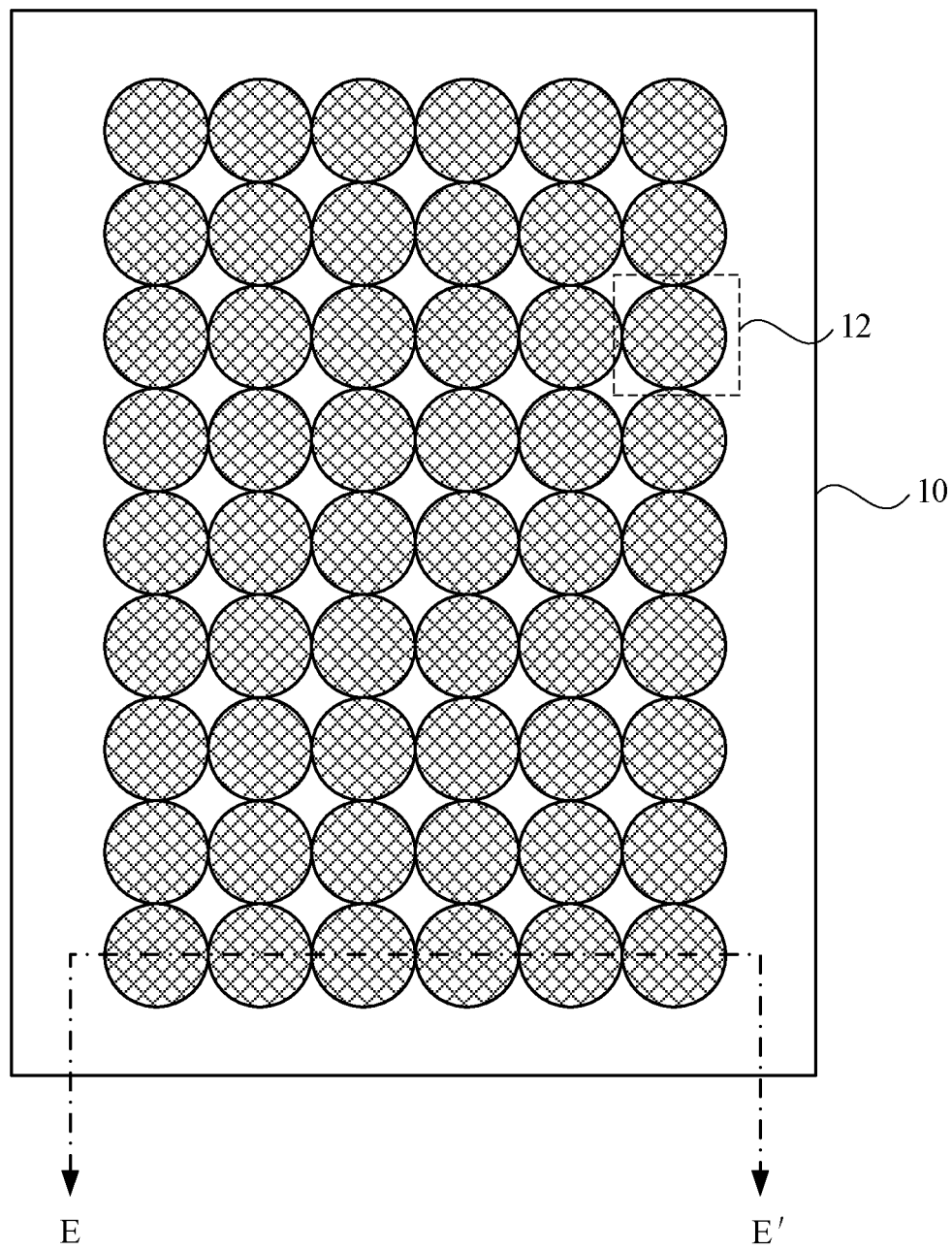
FIG. 11 is a top view of a liquid crystal display panel according to an embodiment of the present disclosure.
Figure 12:
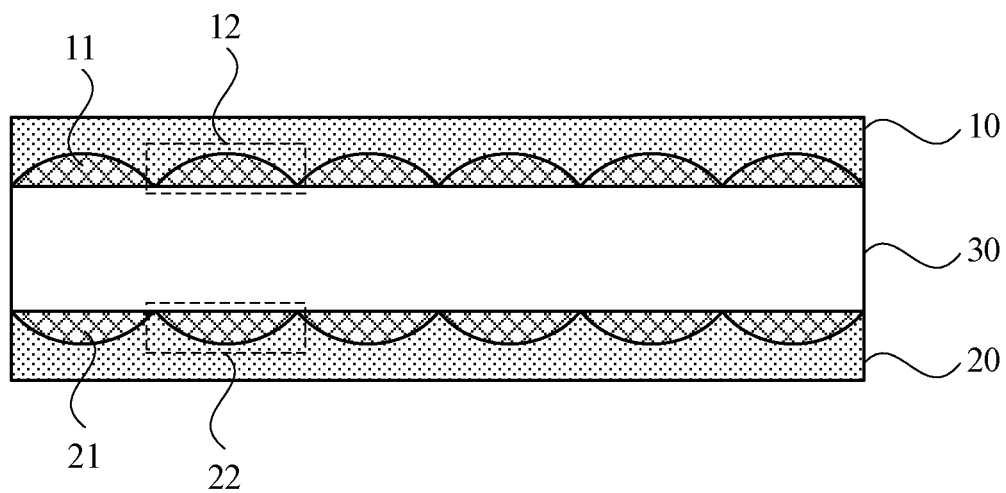
FIG. 12 is a cross sectional view taken along a line E-E' in FIG. 11.

FIG. 11 is a top view of a liquid crystal display panel according to an embodiment of the present disclosure, and FIG. 12 is a cross sectional view taken along a line E-E' in FIG. 11. Referring to FIGS. 11 and 12, optionally, the number of the first grooves 12 is plural, and the multiple first grooves 12 are arranged in an array on the first substrate 10. The number of the second grooves 22 is the same as the number of the first grooves 12, and a projection of each first groove 12 on the second substrate 20 fully overlaps with a corresponding second groove 22. Optionally, the projection of each first groove on the second substrate is a circle, and a diameter of the circle ranges from 0.3 mm to 0.6 mm.

It should be understood that the outer surface of the light-incident side substrate and the outer surface of the light-emitting side substrate of the liquid crystal display panel are provided with an array of convex lenses, and the backlight used in the 3D printing process is the near-ultraviolet light. In the related art, a Fresnel lens is added above the backlight LED to make the light to be collimated and emitted. Although it may improve the collimation of the backlight, the light has a certain divergence angle after passing through the liquid crystal display panel, and the light may also scatter at the panel, which may not solve the problem fundamentally. In addition, compared with the actual printed image, the output printed image is enlarged which causes the scale distortion, and the printing accuracy is reduced, which fails to meet requirements of precision printing such as in medical treatment. The arrays of the first lenses and the second lenses may be manufactured through a photosensitive glass thermoforming method or through a femtosecond laser acid etching method in combination with a precision injection molding method. The surfaces of the first substrate and the second substrate are smooth, and the diameter of a single lens may range from 0.3 mm to 0.6 mm Therefore, in one aspect, the collimation of the incident light from the backlight to the panel may be improved, and the divergence angle of the light source is reduced appropriately to reduce light leakage. In another aspect, since the liquid crystal layer has a scattering effect on the light, the microlens is disposed close to the liquid crystal layer, so that the scattered light in the non-opening area may be converged and emitted from the opening area, thereby indirectly improving the aperture opening ratio and improving the white-state brightness.

Figure 13:
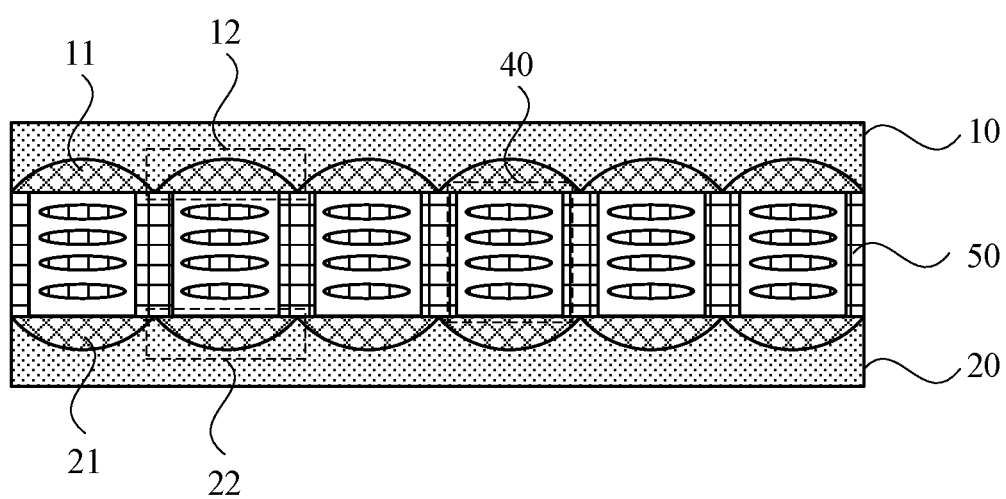
FIG. 13 is a structural diagram of another liquid crystal display panel according to an embodiment of the present disclosure.

FIG. 13 is a structural diagram of another liquid crystal display panel according to an embodiment of the present disclosure. Referring to FIG. 13, optionally, the liquid crystal display panel includes multiple pixel units 40. The multiple first grooves 12 and the multiple pixel units 40 are disposed in a one-to-one correspondence in position.

It should be understood that the liquid crystal layer of the liquid crystal display panel forms the multiple pixel units 40, each pixel unit 40 has a corresponding driving circuit (not shown) formed by a thin film transistor, a data line, a scan line and the link. The first groove 12 and the second groove 22 are in one-to-one correspondence with the pixel unit 40, each first lens 11 and each second lens 21 converge the light of the corresponding pixel unit 40. Since the 3D printing works at the short waveband fixed wavelength (near ultra-violet), no color resist layer is required to be set, which may improve the clarity of the liquid crystal display panel picture, thereby improving the accuracy of 3D printing.

Referring to FIG. 13, optionally, the liquid crystal display panel further includes blocking walls 50 disposed between the first substrate 10 and the second substrate 20. The blocking wall sheet 50 includes hole structures. Each pixel unit 40 is space apart from its neighbors with the blocking wall material. The hole structures are patterned such that the one pixel unit is aligned with one of the holes. Each hole structure of the blocking wall 50 is filled with liquid crystal molecules. Optionally, a forming material of the blocking wall 50 includes chromium.

Figure 14:
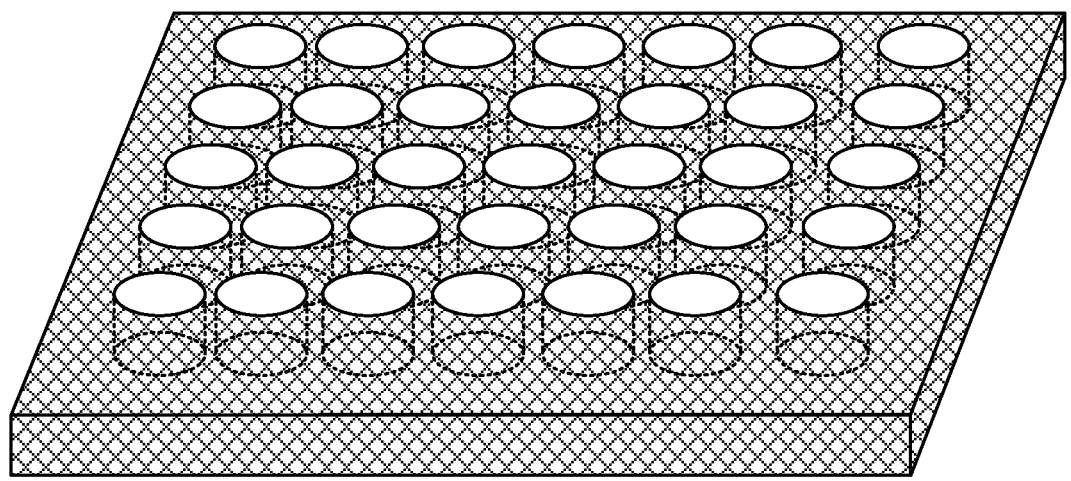
FIGS. 14 and 15 are structural diagrams of blocking walls respectively according to some embodiments of the present disclosure.
Figure 15:
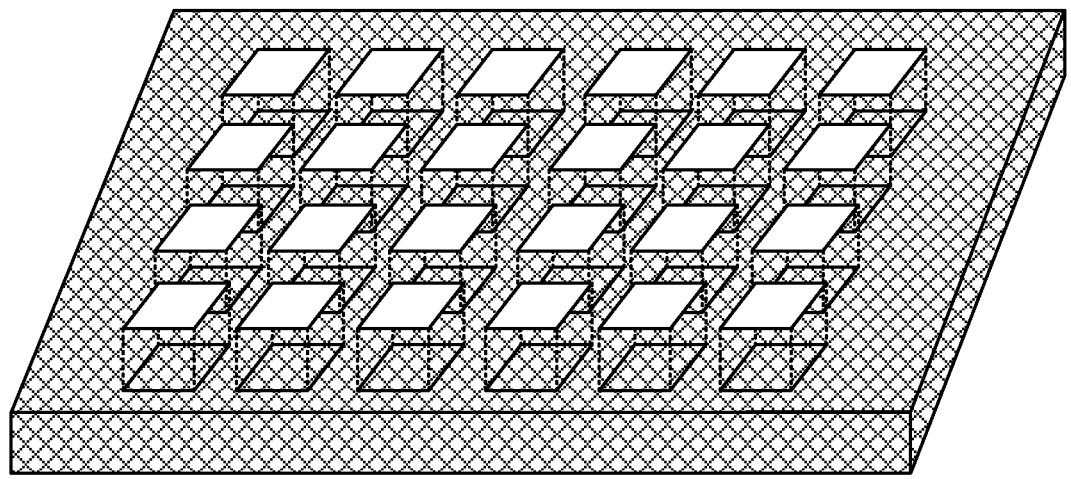

FIGS. 14 and 15 are respectively structural diagrams of blocking walls according to the embodiments of the present disclosure. Referring to FIG. 14, the blocking wall sheet includes hole structures which are patterned to align with the pixel units. Exemplarily, one hole structure may be a circular hole as shown in FIG. 14, or may be a square hole as shown in FIG. 15, or may be in other polygonal shapes. The blocking wall is a sheet disposed between the first substrate and the second substrate, and the liquid crystal molecules are disposed inside the hole structures. It should be understood that, since an array substrate of the liquid crystal display panel includes the thin film transistor and various trace structures, a black matrix is disposed on a color filter substrate to block the thin film transistor and various traces. The blocking wall provided by the present disclosure may adopt the same material as the black matrix, such as chromium, so that, in one aspect, the black matrix may be eliminated, and in another aspect, each hole structure of the blocking wall may form an aperture which fits the first lens and the second lens. It should be understood that due to the excessive deflection angles of the incident light or the scattering of the light by the liquid crystal molecules, oblique light inevitably exists in the liquid crystal layer. Without blocking walls, the light may enter adjacent pixel units and cause signal crosstalks. The blocking wall may be formed from chrome element by an electroplating process, or a frame structure of the blocking wall may be formed from other materials. A layer of chrome is plated on the inner walls of the holes in the blocking wall, or the layer of chrome is formed on the inner walls of the holes in the blocking wall through physical deposition or chemical deposition. A reflective surface of the blocking wall may be formed, which may prevent large-angle incident light from scattering into adjacent pixel areas causing the crosstalks, and may also reflect the oblique light back to the hole structures to increase luminous flux, therefore, improving the brightness of the liquid crystal display panel.

Optionally, projections of each first groove 12 and each hole structure on the first substrate 10 are both circles, and a diameter of the projection of each first groove 12 on the first substrate 10 is greater than a diameter of the hole structure under the groove.

By configuring the aperture of the first groove to be greater than the aperture of the hole structure, the lens has a circular design, this arrangement ensures good optical performance.

Figure 16:
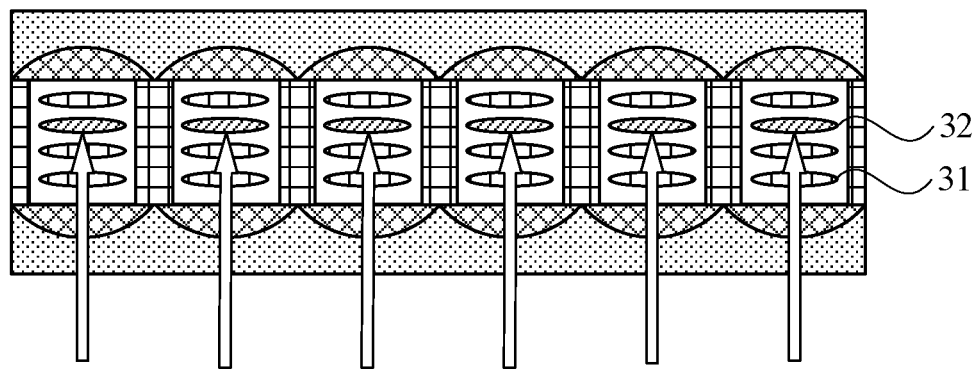
FIGS. 16 and 17 are structural diagrams of two types of liquid crystal display panels respectively according to some embodiments of the present disclosure.
Figure 17:
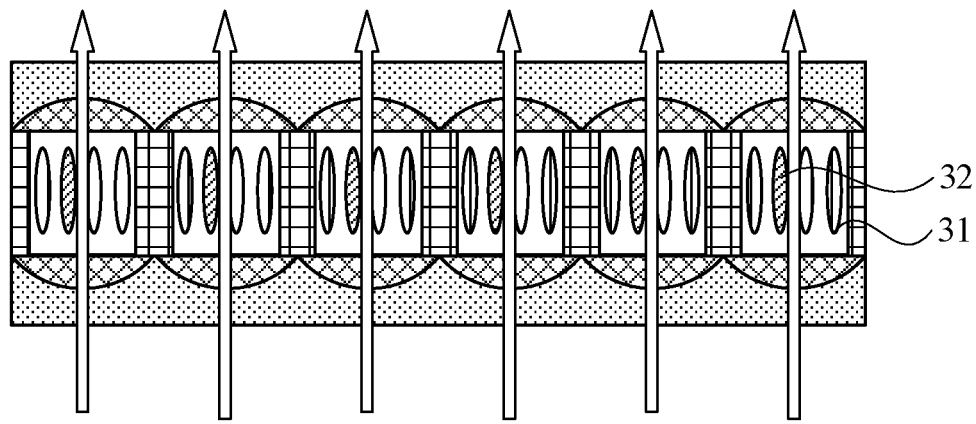

FIGS. 16 and 17 are structural diagrams of other liquid crystal display panels respectively according to some embodiments of the present disclosure. Referring to FIG. 16, optionally, the liquid crystal layer includes both nematic liquid crystal molecules 31 and dye liquid crystal molecules 32.

It should be understood that the existing 3D printing liquid crystal display panel generally uses only nematic liquid crystal molecules, so that the black state is not black enough, and the contrast is low. The dye liquid crystal molecules are used to absorb light under the condition that the dye liquid crystal molecules are not charged, thereby reducing the light transmission function. When charged, the dye liquid crystal molecules are in a light transmission state, and the white state transmissivity is not affected. FIGS. 16 and 17 exemplarily show schematic diagrams of optical paths in the charged and uncharged states respectively. Optionally, a proportion of the dye liquid crystal molecules to total liquid crystal molecules is 0.4% to 10%.

Figure 18:
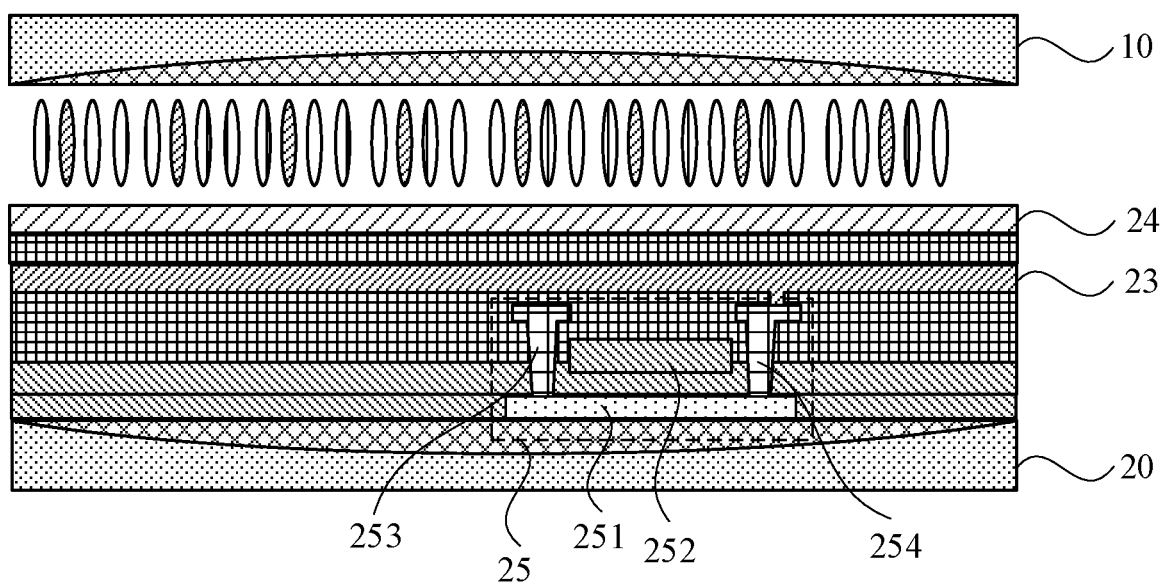
FIG. 18 is a structural diagram of a liquid crystal display panel according to an embodiment of the present disclosure.

FIG. 18 is a structural diagram of a liquid crystal display panel according to an embodiment of the present disclosure. Referring to FIG. 18, optionally, an electrode and an electrode driving circuit are further disposed between the first substrate 10 and the second substrate 20. The electrode driving circuit is configured to drive the electrode to control deflection of liquid crystal molecules in the liquid crystal layer to display different patterns.

Exemplarily, FIG. 18 only shows one pixel unit. Using the electrode disposed on the second substrate 20 as an example, the electrode includes a pixel electrode 23 and a common electrode 24, and the electrode driving circuit includes a thin film transistor 25. The thin film transistor 25 includes a polysilicon active layer 251, a gate 252, a source 253 and a drain 254. The source 253 and the drain 254 are electrically connected to the polysilicon active layer 251 through via holes. The gate 252 is electrically connected to a gate line. The source 253 is electrically connected to the data line. The drain 254 is electrically connected to the pixel electrode 23. When the 3D printing is required, the gate 252 is provided with a scan signal through the data line. The data line provides a pixel voltage signal to the pixel electrode 23, and applies a common voltage to the common electrode 24. An electric field for controlling the liquid crystal molecules is formed between the pixel electrode 23 and the common electrode 24. The design of the specific electrode and the electrode driving circuit adopts the design in the liquid crystal display panel in the related art, which is not limited by the present disclosure.

Optionally, the first lens is configured to collimate light emitted from the liquid crystal display panel, and the second lens is configured to converge light emitted into the liquid crystal display panel; or the second lens is configured to collimate the light emitted from the liquid crystal display panel, and the first lens is configured to converge the light emitted into the liquid crystal display panel.

It should be understood that the liquid crystal display panel provided by the present disclosure is different from the ordinary liquid crystal display panel, and the liquid crystal panel does not include a backlight. Therefore, the second substrate may be used as the light-incidence side, and the first substrate may be used as the light-emitting side, or the first substrate may be used as the light-incidence side, and the second substrate may be used as the light-storage side. That is, the first lens may be configured to collimate the light emitted from the liquid crystal display panel, and the second lens may be configured to converge the light emitted into the liquid crystal display panel; or the second lens may be configured to collimate the light emitted from the liquid crystal display panel, and the first lens may be configured to converge the light emitted into the liquid crystal display panel.

Figure 19:
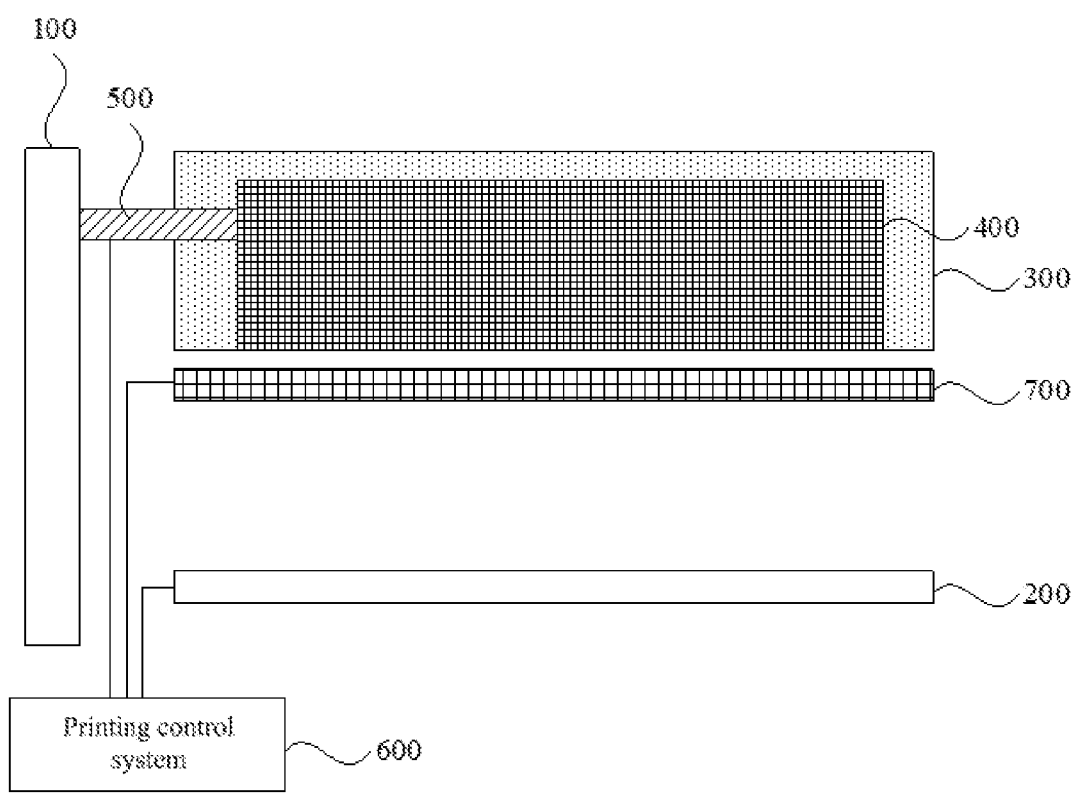
FIG. 19 is a structural diagram of a 3D printer according to an embodiment of the present disclosure.

FIG. 19 is a structural diagram of a 3D printer according to an embodiment of the present disclosure. Referring to FIG. 19, the 3D printer includes a rack 100, a light source 200, a raw material tank 300, a printing platform 400, a lifting device 500, a printing control system 600, and the liquid crystal display panel 700 described in any one of the embodiments of the present disclosure. The lifting device 500 is connected to the printing platform 400 and is disposed on the rack 100. The raw material tank 300 is disposed below the printing platform 400 and a bottom of the raw material tank 300 is transparent. The liquid crystal display panel 700 is disposed below the raw material tank 300, and the light source 200 is disposed below the liquid crystal display panel 700. The printing control system 600 is electrically connected to the light source 200, the lifting device 500 and the liquid crystal display panel 700 respectively, and is configured to control light emitted by the light source 200 to be emitted to the printing platform 400 through the liquid crystal display panel 700 to enable a raw material on a surface of the printing platform 400 to implement 3D printing.

Exemplarily, the light source 200 may adopt a 385 nm/405 nm/420 nm near-ultraviolet lattice LED light source, and the print raw material may adopt a liquid resin which is cured by the ultraviolet light, which may be selected according to actual conditions and is not limited by the present disclosure.

It to be noted that the above are merely preferred embodiments of the present disclosure and the technical principles used therein. It will be understood by those skilled in the art that the present disclosure is not limited to the embodiments described herein. Those skilled in the art can make various apparent modifications, adaptations, combinations and substitutions without departing from the scope of the present disclosure. Therefore, while the present disclosure has been described in detail via the above-mentioned embodiments, the present disclosure is not limited to the above-mentioned embodiments and may include more other equivalent embodiments without departing from the concept of the present disclosure. The scope of the present disclosure is determined by the scope of the appended claims.

The invention claimed is:

1. A liquid crystal display panel, comprising:
a first substrate and a second substrate disposed opposite to the first substrate; and
a liquid crystal layer which is disposed between the first substrate and the second substrate;
wherein a first surface on a first side of the first substrate is provided with at least one first lens, and a first surface on a first side of the second substrate is provided with at least one second lens;
wherein the first surface on the first side of the first substrate is provided with at least one first groove, and the at least one first groove is filled with a first transparent material to form the at least one first lens;
wherein the first surface on the first side of the second substrate is provided with at least one second groove, and the at least one second groove is filled with a second transparent material to form the at least one second lens;
wherein the at least one first groove comprises a plurality of first grooves, wherein the plurality of first grooves is disposed in an array on the first substrate; and
wherein a number of the at least one second groove is the same as a number of the at least one first groove, and wherein a projection of each of the at least one first groove on the second substrate fully overlaps with a respective one of the at least one second groove;
wherein the display panel further comprises a plurality of pixel units and a blocking wall disposed between the first substrate and the second substrate, the plurality of first grooves each is aligned to the plurality of pixel in a one-to-one correspondence, the blocking wall comprises a plurality of hole structures through the blocking wall, each of the plurality of hole structures is aligned to one of the plurality of pixel units, and wherein each of the plurality of hole structures of the blocking wall is filled with liquid crystal molecules; and
wherein both a projection of each of the plurality of first grooves and a projection of each of the plurality of hole structures on the first substrate are circles, wherein a diameter of the projection of each of the plurality of first grooves on the first substrate is greater than an aperture of the each of the plurality of hole structures.

2. The liquid crystal display panel of claim 1, wherein a shape of the at least one first groove is one of a spherical crown, a half-cylinder, a prism and a cone; and wherein a shape of the at least one second groove is one of the spherical crown, the half-cylinder, the prism and the cone.

3. The liquid crystal display panel of claim 1, wherein the shape of the at least one first groove is a reverse of the shape of the at least one second groove, and wherein a projection of the at least one first groove on the second substrate fully overlaps with the at least one second groove.

4. The liquid crystal display panel of claim 1, wherein a refractive index of the first transparent material is greater than a refractive index of the first substrate, and a refractive index of the second transparent material is greater than a refractive index of the second substrate.

5. The liquid crystal display panel of claim 4, wherein a forming material of the first substrate or the second substrate is glass, and wherein either the first transparent material or the second transparent material comprises one of silicon, quartz and polymethyl methacrylate.

6. The liquid crystal display panel of claim 1, wherein a refractive index of either the first transparent material or the second transparent material ranges from 0.8 to 5.0.

7. The liquid crystal display panel of claim 1, wherein transmissivity of at least one of the first transparent material and the second transparent material is greater than 95%.

8. The liquid crystal display panel of claim 1, wherein the projection of each of the at least one first grooves on the first substrate is a circle, and wherein a diameter of the circle ranges from 0.3 mm to 0.6 mm.

9. The liquid crystal display panel of claim 1, wherein a forming material of the blocking wall comprises chromium.

10. The liquid crystal display panel of claim 1, wherein the liquid crystal layer comprises nematic liquid crystal molecules and dye liquid crystal molecules.

11. The liquid crystal display panel of claim 10, wherein a weight ratio of the dye liquid crystal molecules to total liquid crystal molecules is 0.4% to 10%.

12. The display panel of claim 1, wherein an electrode and an electrode driving circuit are further disposed between the first substrate and the second substrate, and wherein the electrode driving circuit is configured to drive the electrode to control deflection of liquid crystal molecules in the liquid crystal layer to display different patterns.

13. The liquid crystal display panel of claim 1, wherein either the at least one first lens is configured to collimate light emitted from the liquid crystal display panel and the at least one second lens is configured to converge light emitted into the liquid crystal display panel, or the at least one second lens is configured to collimate the light emitted from the liquid crystal display panel and the at least one first lens is configured to converge the light emitted into the liquid crystal display panel.

14. A three-dimensional (3D) printer, comprising: a rack, a light source, a raw material tank, a printing platform, a lifting device, a printing control system, and a liquid crystal display panel;

wherein the liquid crystal display panel comprises: a first substrate and a second substrate disposed opposite to the first substrate, and a liquid crystal layer which is disposed between the first substrate and the second substrate;

wherein a first surface on a first side of the first substrate is provided with at least one first lens, and a first surface on a first side of the second substrate is provided with at least one second lens;

wherein the lifting device is connected to the printing platform at one end and the rack on another end;

wherein the raw material tank is disposed as a base to the printing platform and a bottom of the raw material tank is transparent;

wherein the liquid crystal display panel is disposed below the raw material tank, and the light source is disposed below the liquid crystal display panel; and wherein the printing control system is electrically connected to the light source, the lifting device and the liquid crystal display panel respectively, and is configured to control light emitted by the light source to be emitted to the printing platform through the liquid crystal display panel to enable a raw material on a surface of the printing platform to implement 3D printing.

15. The three-dimensional (3D) printer of claim 14, wherein the liquid crystal display panel comprises, a blocking wall disposed between the first substrate and the second substrate, wherein the blocking wall comprises a plurality of hole structures through the blocking wall, wherein each of the plurality of hole structures is aligned to the at least one first lens and the at least one second lens at each end of the hole structure, and one of a plurality of pixel units on the liquid crystal display panel, and wherein each of the plurality of hole structures of the blocking wall is filled with liquid crystal molecules, and wherein interior walls of the plurality hole structures are coated with metallic films.

* * * * *